(12) United States Patent
Lilley et al.

(10) Patent No.: US 10,438,092 B2
(45) Date of Patent: Oct. 8, 2019

(54) SYSTEMS AND METHODS FOR CONVERTING MASSIVE POINT CLOUD DATASETS TO A HIERARCHICAL STORAGE FORMAT

(71) Applicant: Analytical Graphics, Inc., Exton, PA (US)

(72) Inventors: Sean Lilley, Exton, PA (US); Kangning Li, North Wales, PA (US); Zakiuddin Mohammed, King of Prussia, PA (US); Patrick Cozzi, Drexel Hill, PA (US); Joshua Lawrence, Media, PA (US)

(73) Assignee: Analytical Graphics, Inc., Exton, PA (US)

( * ) Notice: Subject to any disclaimer, the term of this patent is extended or adjusted under 35 U.S.C. 154(b) by 0 days.

(21) Appl. No.: 16/167,422

(22) Filed: Oct. 22, 2018

(65) Prior Publication Data

US 2019/0236403 A1 Aug. 1, 2019

Related U.S. Application Data

(60) Provisional application No. 62/624,309, filed on Jan. 31, 2018.

(51) Int. Cl.
*G06K 9/62* (2006.01)
*G06F 16/185* (2019.01)
(Continued)

(52) U.S. Cl.
CPC .............. *G06K 9/6211* (2013.01); *G06F 9/28* (2013.01); *G06F 12/0848* (2013.01);
(Continued)

(58) Field of Classification Search
CPC .......... G06F 16/185; G06F 17/18; G06F 9/28; G06F 12/0848; G06K 9/6211; G06K 9/6286; G06K 9/6219
See application file for complete search history.

(56) References Cited

U.S. PATENT DOCUMENTS

| | | | | |
|---|---|---|---|---|
| 5,758,353 A | * | 5/1998 | Marquis | G06F 16/9027 707/744 |
| 5,781,906 A | * | 7/1998 | Aggarwal | G06F 16/2264 |

(Continued)

OTHER PUBLICATIONS

Ohlarik, Deron et al., "A Screen-Space Approach to Rendering Polylines on Terrain: Implementation Details", Analytical Graphics, Inc., Apr. 25, 2011, 3 pages.

*Primary Examiner* — James Trujillo
*Assistant Examiner* — Hubert Cheung
(74) *Attorney, Agent, or Firm* — Carr & Ferrell LLP (57) ABSTRACT

Methods and systems for converting a point cloud dataset into a hierarchical data structure for a lossless representation of an input file are provided herein. In various embodiments the method comprises recursing subtrees using a preordered traversal for a plurality of nodes, the preordered traversal being checking a parent node and then checking children nodes and stopping the recursing of the subtrees using the preordered traversal of the plurality of nodes when a node of the plurality of nodes is a below threshold node. The below threshold node being less than a configuration specified maximum number of data points, the below threshold node being a leaf of a tileset. Further comprising, aggregating the leaf of the tileset into a lossless representation of the collection of input files.

22 Claims, 6 Drawing Sheets

(51) Int. Cl.
  *G06F 17/18* (2006.01)
  *G06F 9/28* (2006.01)
  *G06F 12/0846* (2016.01)

(52) U.S. Cl.
  CPC ............ *G06F 16/185* (2019.01); *G06F 17/18* (2013.01); *G06K 9/6219* (2013.01); *G06K 9/6286* (2013.01)

(56) References Cited

U.S. PATENT DOCUMENTS

| | | | | |
|---|---|---|---|---|
| 5,802,525 A * | 9/1998 | Rigoutsos | ............ | G06F 16/9014 |
| 5,892,513 A * | 4/1999 | Fay | ............ | G06F 16/93 |
| | | | | 715/854 |
| 5,893,086 A * | 4/1999 | Schmuck | ............ | G06F 11/1435 |
| 5,940,841 A * | 8/1999 | Schmuck | ............ | G06F 11/1435 |
| 5,960,446 A * | 9/1999 | Schmuck | ............ | G06F 16/1858 |
| | | | | 707/610 |
| 5,974,424 A * | 10/1999 | Schmuck | ............ | G06F 16/1858 |
| 6,029,170 A * | 2/2000 | Garger | ............ | G06F 16/2246 |
| 6,230,151 B1 * | 5/2001 | Agrawal | ............ | G06F 8/453 |
| | | | | 706/12 |
| 9,075,754 B1 * | 7/2015 | Sadhu | ............ | G06F 11/1458 |
| 2010/0174690 A1 * | 7/2010 | Marcotte | ............ | G06F 16/178 |
| | | | | 707/695 |
| 2013/0124794 A1 * | 5/2013 | Bux | ............ | G06F 12/0246 |
| | | | | 711/103 |
| 2015/0193353 A1 * | 7/2015 | Habermann | ............ | G06F 12/0897 |
| | | | | 711/122 |
| 2016/0292234 A1 * | 10/2016 | Kathewadi | ............ | G06F 16/2246 |
| 2017/0109420 A1 * | 4/2017 | Allbright | ............ | H04L 47/726 |
| 2017/0124385 A1 * | 5/2017 | Ganong | ............ | G06K 9/00677 |
| 2017/0161945 A1 * | 6/2017 | Robert | ............ | G06T 17/005 |

* cited by examiner

FIG. 6

SYSTEMS AND METHODS FOR CONVERTING MASSIVE POINT CLOUD DATASETS TO A HIERARCHICAL STORAGE FORMAT

CROSS-REFERENCE TO RELATED APPLICATION

This patent application claims the benefit of U.S. Provisional Patent Application Ser. No. 62/624,309, filed Jan. 31, 2018, titled "Systems and Methods for Converting Massive Point Cloud Datasets to a Hierarchical Storage Format." The aforementioned disclosure is hereby incorporated by reference herein in its entirety including all references and appendices cited therein.

FIELD OF INVENTION

The present invention pertains to methods for converting point cloud datasets. In particular, but not by way of limitation, the present technology provides systems and methods for converting point cloud datasets into a hierarchical storage format for a lossless representation of an input file.

SUMMARY

In exemplary embodiments, the present technology comprises a method for converting a point cloud dataset into a hierarchical data structure for a lossless representation of an input. In various embodiments the method comprises (a) reading header information of a collection of input files, the reading of the header information determining an overall bounding box of the collection of input files and a total number of data points in a point cloud dataset; (b) determining a cache level of the total number of data points in the point cloud dataset to generate a plurality of caches, the cache level being a level of program memory to fit all of the total number of data points in the point cloud dataset; (c) subdividing each of the plurality of caches into subtrees based on the determining of the cache level of the total number of data points in the point cloud dataset, the subtrees having a plurality of nodes; (d) recursing the subtrees using a preordered traversal for the plurality of nodes, the preordered traversal being checking a parent node and then checking children nodes; (e) continuing the recursing of the subtrees using the preordered traversal of the plurality of nodes when a node of the plurality of nodes is an above threshold node, the above threshold node being more data points than a configuration specified maximum number of data points; (f) sampling the children nodes of the above threshold node resulting in a representative point collection for the above threshold node, the representative point collection being a lower level of detail of the above threshold node; (g) stopping the recursing of the subtrees using the preordered traversal of the plurality of nodes when a node of the plurality of nodes is a below threshold node, the below threshold node being less data points than a configuration specified maximum number of data points and the below threshold node being a leaf of a tileset; and (h) generating the tileset based on sorting of the plurality of nodes in the subtrees, the generating of the tileset resulting in the hierarchical data structure comprising a root tile and a plurality of children. In some embodiments, the writing the representative point collection to disk resulting in an interior tile of the tileset. In various embodiments the exemplary method includes aggregating the interior tile of the tileset into a lossless representation of the collection of input files.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the technology so as not to obscure the disclosure with details that will be readily apparent to those of ordinary skill in the art having the benefit of the description herein.

DETAILED DESCRIPTION

The following detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

In general, the present technology is directed to systems and methods of converting huge point cloud datasets into a format that can be rendered efficiently. In exemplary embodiments of the present technology, methods are provided to convert a point cloud dataset into a hierarchical storage format.

A point cloud is a set of data points, where each data point is designated by a position in space and optional attributes like color, intensity, and classification. Typically, a point cloud set of data points is initially unordered and may be included in input files that are too large and not suitable for streaming. For example, a point cloud is typically collected by LIDAR devices for the purpose of constructing a virtual three dimensional representation of a surveyed site. The raw point cloud produced by LIDAR devices is often bulky and not spatially organized, making it impractical to stream over the web in some instances or render efficiently. Furthermore, in the prior art, methods that convert point clouds are often inefficient, too slow, and do not provide an optimal means to process or view the data point sets in a renderable format that is suitable for streaming. In contrast, methods of the present technology enable efficient streaming and rendering of point cloud data by organizing data points into a hierarchical spatial data structure.

In some instances, exemplary methods of the present technology outperform what is known in the art. Specifically, the exemplary methods disclosed herein may have a runtime that is ten times faster than what is known in the art. Moreover, methods of the present technology provide datasets that are optimized.

In accordance with various embodiments of the present technology, methods of converting a point cloud dataset utilize an out-of-core approach. In other words, the input dataset cannot fit into memory due to the large size of the input dataset. The present technology provides methods that split the input dataset into different chunks of data, and then process the different chunks of data in parallel in a multi-threaded way to convert the data into an output tileset, which is in a ready-to-render format. The resulting tileset is a spatially ordered representation of the point cloud dataset.

In various embodiments the present technology provides methods that include several steps in order to convert a point cloud dataset into a hierarchical storage format as discussed below. The exemplary diagrams in FIG. 1 and FIG. 3 use LAS as a representative LIDAR format. However, methods of the present technology are not limited to a LIDAR format. A person of ordinary skill in the art would apply methods and systems of the present technology to other data formats. Furthermore, all diagrams are represented as binary trees for simplicity. However, in practice methods and systems of the present technology may use an octree or quadtree data structure in various embodiments.

Figure 1:
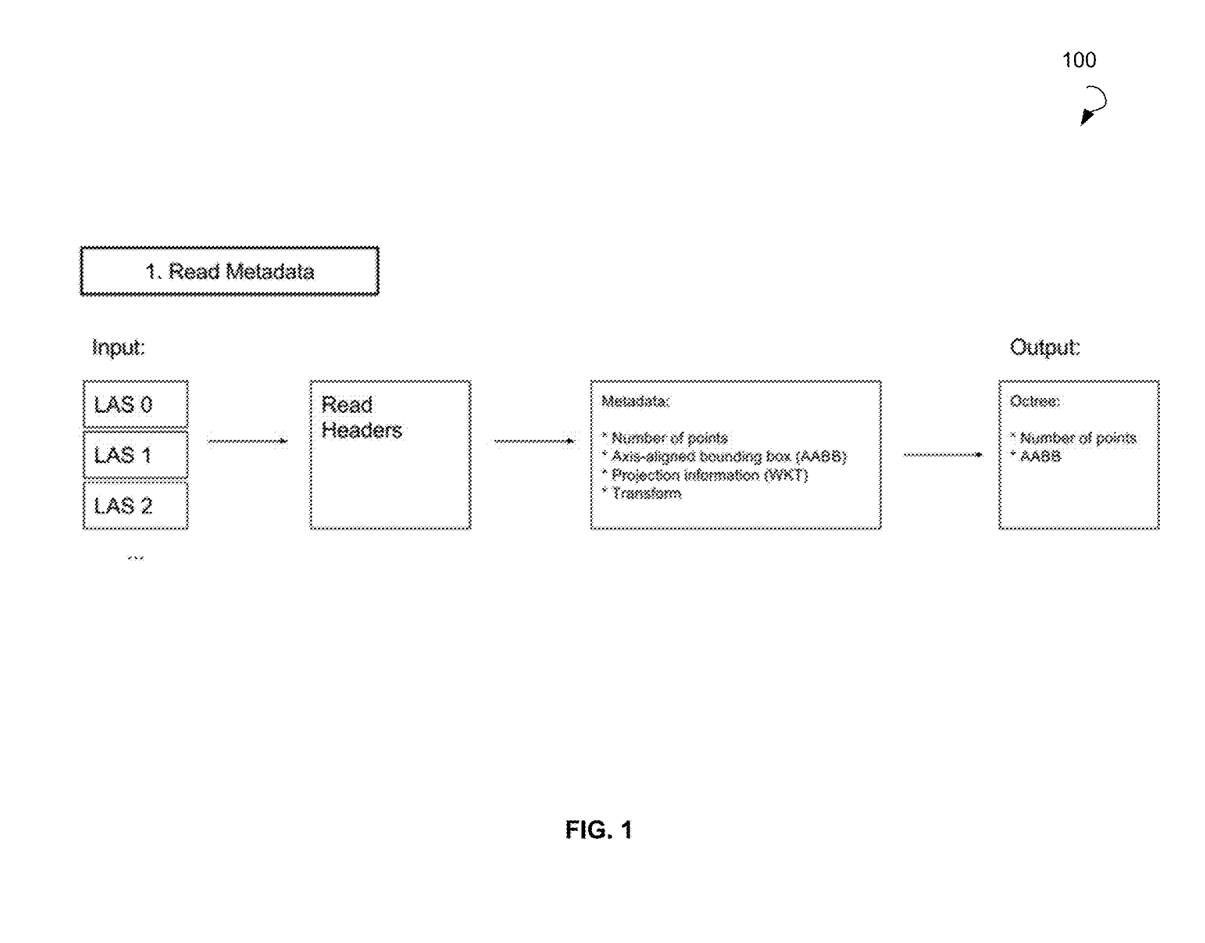
FIG. 1 is a block diagram of reading metadata according to exemplary embodiments of the present technology.

FIG. 1 is a block diagram 100 showing reading of metadata according to exemplary embodiments of the present technology. In accordance with embodiments of the present technology, block diagram 100 begins with reviewing input data. For example, the input data dataset (e.g., point cloud, also referenced as point cloud dataset) may be part of a collection of files with sizes ranging from hundreds of megabytes to hundreds of gigabytes. Exemplary methods include reading header information of a collection of input files, the reading of the header information determining an overall bounding box of the collection of input files and a total number of data points in a point cloud dataset. For example, to determine how big the point cloud dataset is and how many data points the point cloud dataset contains, the headers of the input files are read. Specifically, the metadata associated with the point cloud dataset is read, to determine how many total data points the point cloud dataset contains, the axis-aligned bounding box (AABB) of the point cloud dataset (i.e., how much space the point cloud dataset takes), as well as projection information of the point cloud dataset.

Figure 2:
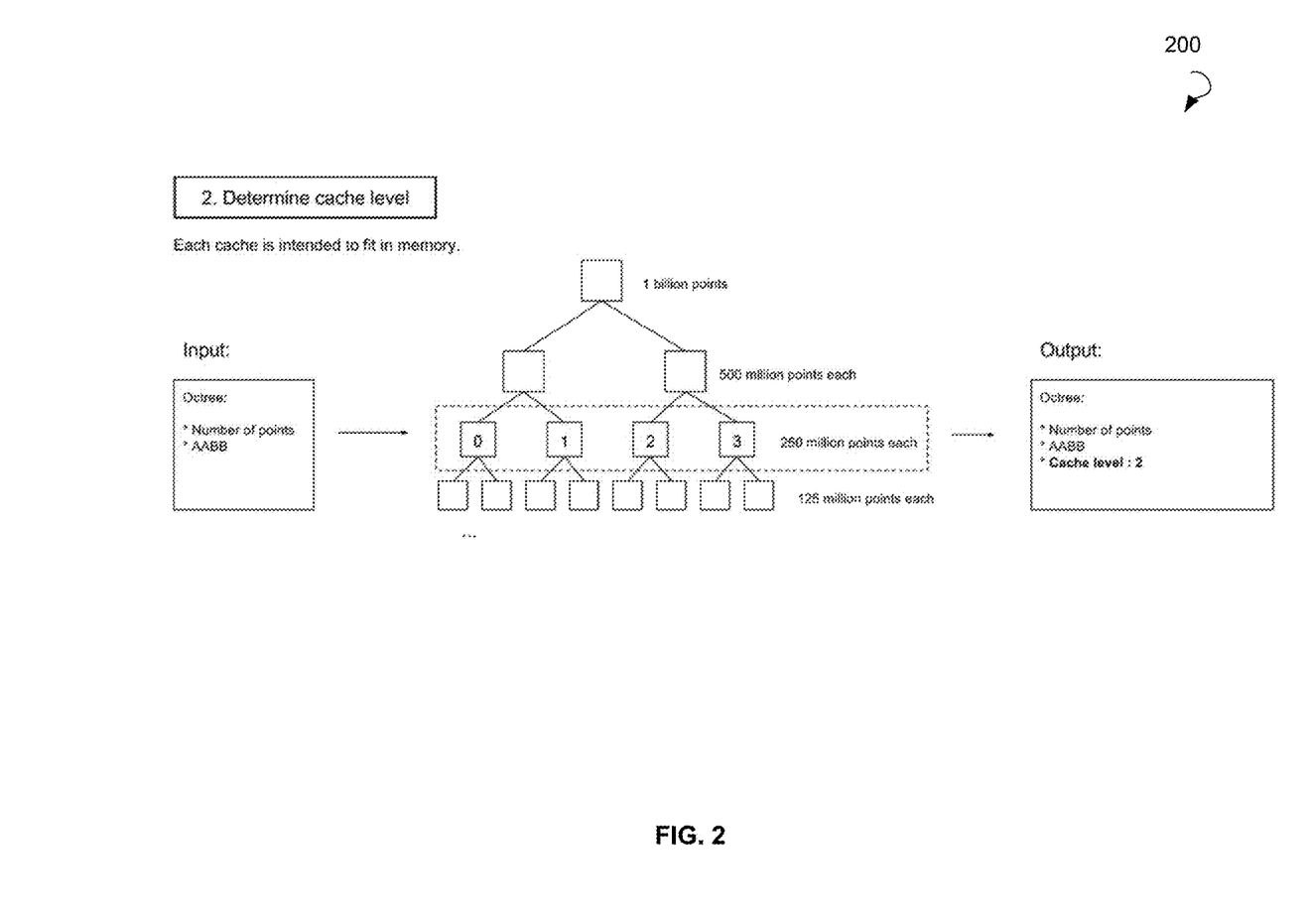
FIG. 2 is a block diagram of determining cache level according to exemplary embodiments of the present technology.

In various embodiments, the output of diagram 100 is an octree data structure including the total number of data points and the AABB of the point cloud dataset, which are used as the input in diagram 200 of FIG. 2. Exemplary methods include determining a cache level of the total number of data points in the point cloud dataset to generate a plurality of caches, the cache level being a level of program memory to fit all of the total number of data points in the point cloud dataset. For example, the total number of data points and the AABB of the point cloud dataset are used to initialize an octree data structure, which defines the spatial organization of points.

FIG. 2 is the block diagram 200 for determining cache level according to exemplary embodiments of the present technology. The number of data points and the AABB of the point cloud dataset are also used to determine the "cache level" of the octree, or the level at which all data points contained in each subtree are expected to fit in program memory. Each node in this level is called a "cache". For example, at level 2 (e.g., the "cache level") each node is potentially responsible for managing 250 million data points as shown in FIG. 2. If 250 million points is the memory threshold, then at any one time one of these nodes (a "cache") can be held in memory.

Figure 3:
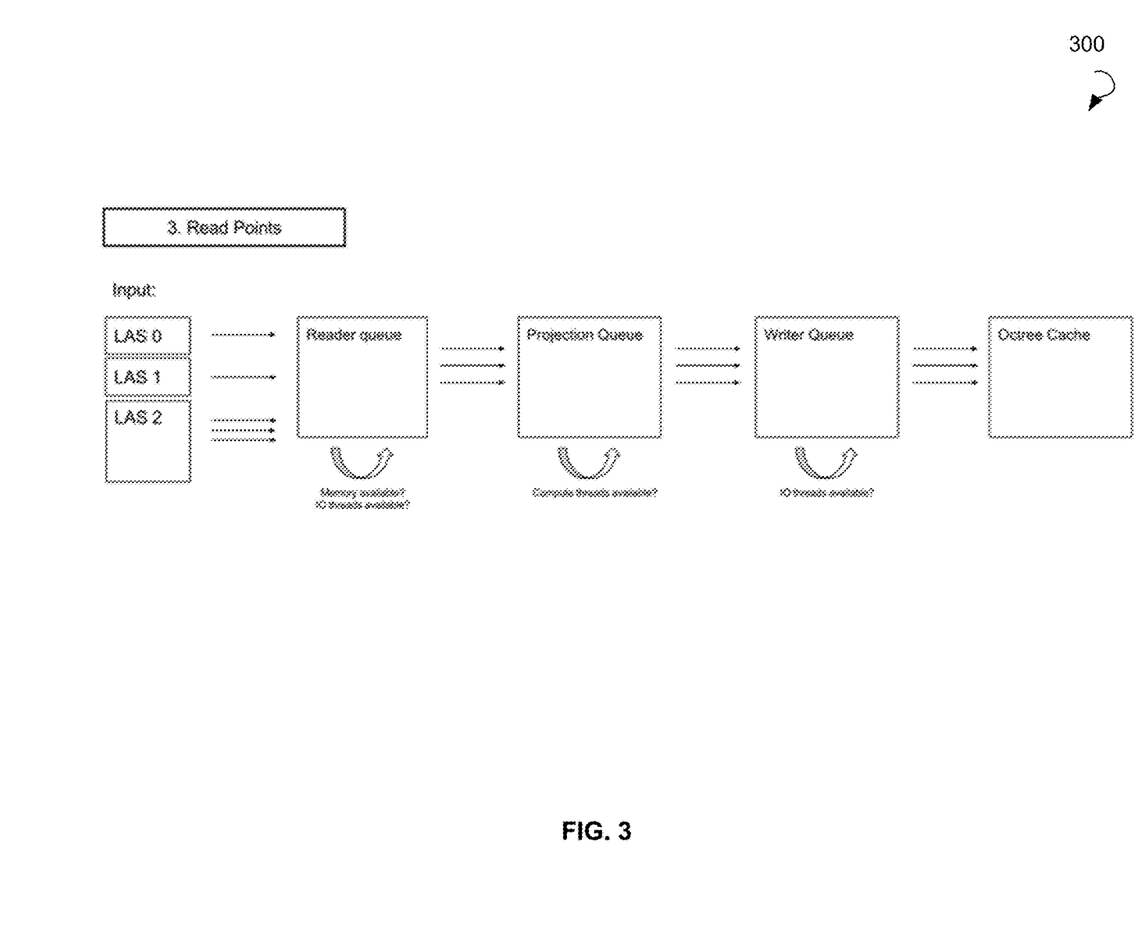
FIG. 3 is a block diagram of reading data points according to exemplary embodiments of the present technology.

FIG. 3 is a block diagram 300 for reading data points according to exemplary embodiments of the present technology. The exemplary method continues by reading the input data points and inserting the input data points into caches as shown in diagram 300. In various embodiments, the reading of the input data points and inserting of the input data points into caches includes three sub-steps: reading the data points, optionally projecting the data points to an appropriate coordinate system, and writing the data points to the caches. Each stage of these three sub-steps is multi-threaded so that multiple input files may be processed in parallel. The output of the method in diagram 300 is an octree cache.

In various embodiments, one issue that may arise when working with point cloud datasets is that oftentimes, there is so much data that all the data cannot be loaded at one time. Thus, there is a need to find a level of data structure, such as an octree (i.e., a uniform spatial data structure), where all the data can be inserted, so that all the data can be loaded and processed, which is the cache level. It will be understood by those skilled in the art that the present technology is not limited to octrees. The present technology allows for the use of a number of other data structures, including but not limited to binary trees and quad trees.

In various embodiments, methods of the present technology include reading the total number of data points in the point cloud dataset to produce a plurality of input points, and inserting the plurality of input points into the plurality of caches. The inserting the plurality of input points into a plurality of caches comprises projecting the total number of data points in the point cloud dataset to a coordinate system, and writing the total number of data points in the point cloud dataset to cache.

In various embodiments, the exemplary method continues with building an octree where at each level, a different level of detail of the input dataset is provided. The leaves of the octree are the raw data and the root of the octree is a simplified version of the input point cloud dataset. Since the octree is a uniform spatial data structure, each cache has an implicit bounding volume. Next, every data point is read or reviewed to determine to which cache each data point belongs. The data point position is checked against the bounding volumes of the nodes at that cache level. Data points may be inserted into their respective caches based on a position check. For example, for each data point the method determines which cache the point belongs to and inserts each data point into cache including appending to the cache buffer. When the cache buffer exceeds a memory threshold (e.g., buffer memory is above a threshold of 32 MB or 64 MB) the buffer is written to disk. After all the data points are inserted, all buffers are written to disk, even if the buffers are not full. In various embodiments, the methods are optimized by compressing data points before writing to disk.

Figure 4:
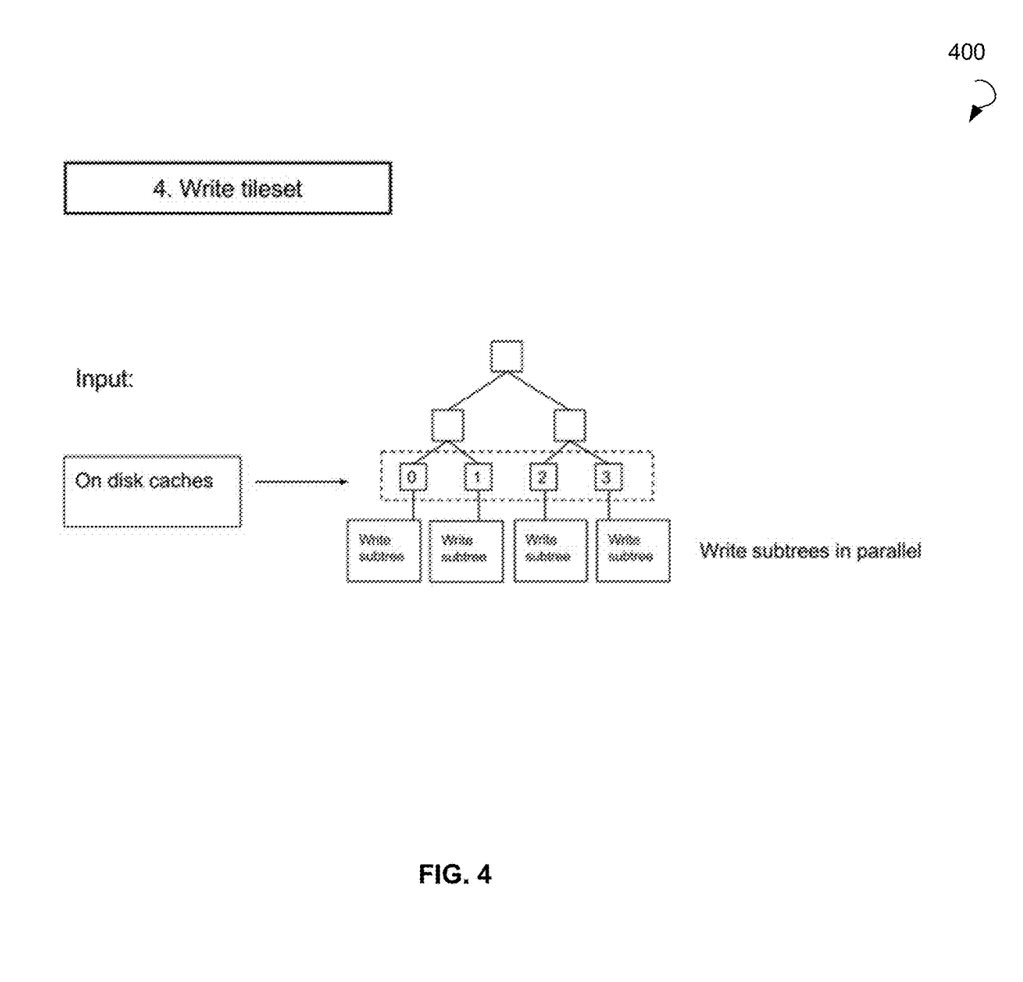
FIG. 4 is a block diagram of writing a tileset according to exemplary embodiments of the present technology.

FIG. 4 is a block diagram 400 showing writing of a tileset according to exemplary embodiments of the present technology. In diagram 400 of the exemplary method, the data is used to write a tileset. Each of the caches fit into memory, even though the initial input data points could not fit into memory. Each of the caches is first stored in memory, and then the unordered data points are sorted into a more detailed subtree. In some embodiments the exemplary methods includes subdividing each of the plurality of caches into subtrees based on the determining of the cache level of the total number of data points in the point cloud dataset, the subtrees having a plurality of nodes. For example, since the caches are still rather large, the data will have to be subdivided further. At this step, a subtree is created for each of these caches. The data points are inserted and sorted based on the nodes in the subtree, as shown in 4.1 "sort points in subtree" of FIG. 5.

Figure 5:
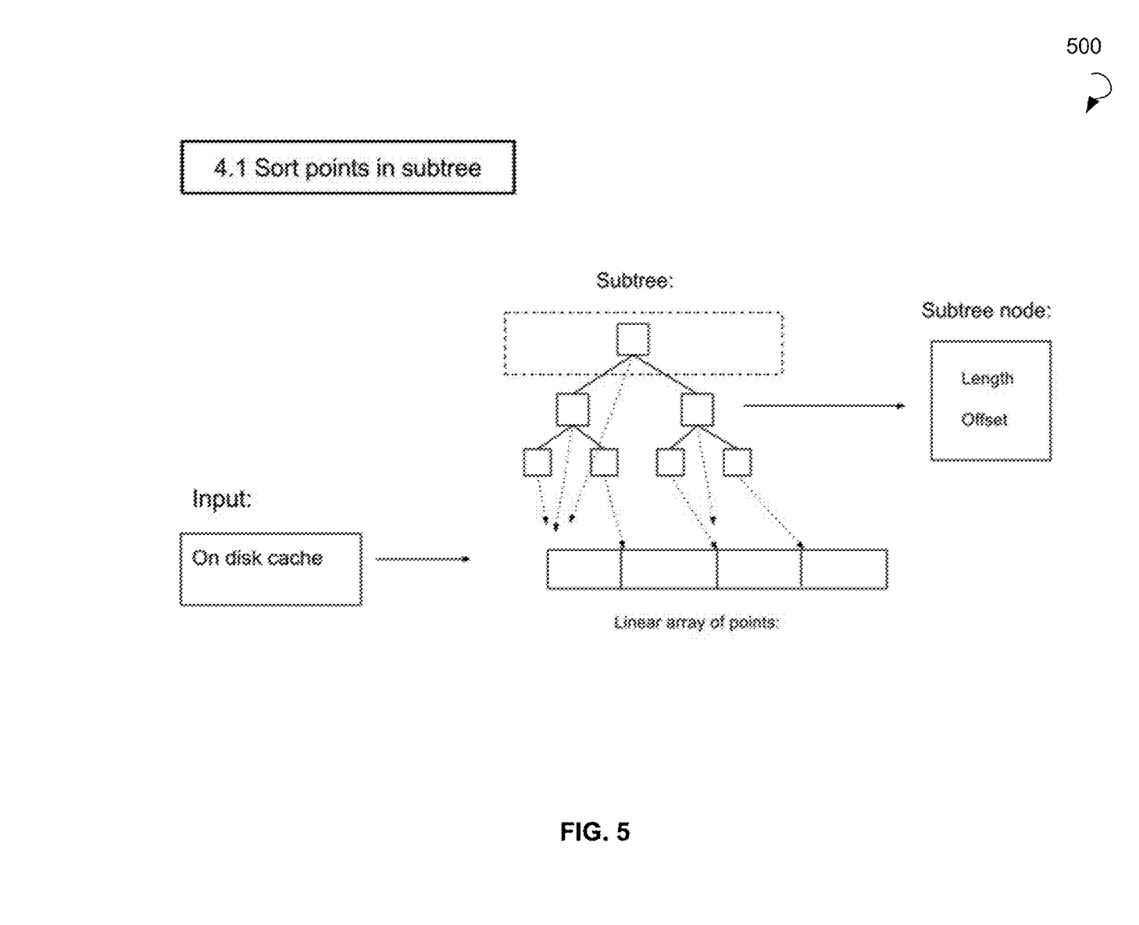
FIG. 5 is a block diagram of sorting data points in subtree according to exemplary embodiments of the present technology.

FIG. 5 is a block diagram 500 showing sorting of data points in subtree according to exemplary embodiments of the present technology. FIG. 5 shows input point data organized into spatial caches on disk according to various embodiments. Although each cache may fit into program memory each cache is still too large as a final output so each cache is further subdivided. For example, each cache is loaded into memory and a subtree depth is estimated based on the number of points in the cache. A subtree data structure is created such that each node will specify an offset and length into the point array. The unordered points are sorted into a spatially ordered array and the nodes are initialized with the following steps: computing a number of points belonging to each leaf node, computing a length and offset of each node recursively from the leaf node information, and inserting points into the sorted array. An index of a point is determined by its leaf node's offset and a counter keeping track of the number of points added to the leaf node so far. In various embodiments, the final result is an array of spatially sorted points such that any node in the subtree references a contiguous section in memory of its contained points. The subtree data structure itself is stored as a flat array with its nodes ordered by the one dimensional Morton-encoded index. In various embodiments, a step is to traverse the subtree and write out files to disk. Any number of subtrees that fit in memory simultaneously may by processed in parallel.

In accordance to some embodiments of the present technology each node is a pointer to a linear array of sorted points and each node contains the length and offset into this linear array. Each node is a section of the raw data points. The data points are sorted and then a preordered traversal is done. During the preordered traversal, the parent node is checked first and then children nodes.

In various embodiments, the exemplary method includes recursing the subtrees using a preordered traversal for the plurality of nodes, the preordered traversal being checking a parent node and then checking children nodes. For example, the exemplary method determines whether an exemplary node has a lesser number of data points than a configured specified maximum number of data points per node (i.e., below threshold node). If so, the method does not continue to subdivide the cache further. Instead, the exemplary method stops traversing and writes the data points of the below threshold node to disk. The below threshold node written to disk comprises a leaf of the final tileset.

In various embodiments, on the other hand, if the exemplary node has a bigger number of data points than a configured specified maximum number of data points per node (i.e., above threshold node), the exemplary method continues to subdivide the cache further. The method then recurses over the children nodes and samples data points from the children nodes to generate a representative data point collection for the above threshold node. For example, strategies for sampling data points from the children nodes of the above threshold node include filtering outlier data points, preserving edges, and establishing a minimum distance between data points. The goal being to synthesize a lower level of detail representation for the above threshold node using children nodes.

In accordance with embodiments of the present technology, the synthesized data point collection is written to disk, which is an interior node of the final tileset. After all subtrees are complete, the exemplary method continues traversing upwards to synthesize parent nodes from the root nodes of the subtree by repeatedly subdividing the cache further as described above.

In some exemplary embodiments, for efficiency purposes, the systems and methods of this technology will compute the subtrees in parallel and utilize the same traversal process. Exemplary methods include generating a tileset based on sorting of the plurality of nodes in the subtrees, the generating of the tileset resulting in the hierarchical data structure comprising a root tile and a plurality of children. For example, ultimately, the output is a hierarchical data structure comprising a root tile at the coarsest level of detail followed by progressively more detailed children. Consequently, the aggregate of all the leaf tiles is a lossless representation of the input data set.

In various embodiments, corner cases exist where a cache will contain more points than can fit into memory. Corner cases stem from points not being distributed evenly in the top level AABB, an assumption made to determine the cache level from just header information. In corner cases, the cache is separated into chunks, where each chunk is loaded into memory, the resulting subtree initialized and points sorted using the methods discussed above. The sorted points are written back to disk. When traversing, the points belonging to current node are extracted from each of the on-disk chunks.

In various embodiments, hierarchical level of detail systems employ either additive or replacement refinement strategies. For example, additive refinement allows for parent and child tiles to render simultaneously, with each successive level adding more data points to be rendered. In contrast, replacement refinement has child tiles render in place of their parent (i.e., replacement of the parent). Additive refinement produces a smaller output overall as no two data points are duplicated, while replacement refinement offers more flexibility for sampling. Exemplary methods support both additive and replacement refinement strategies, and combinations thereof.

Figure 6:
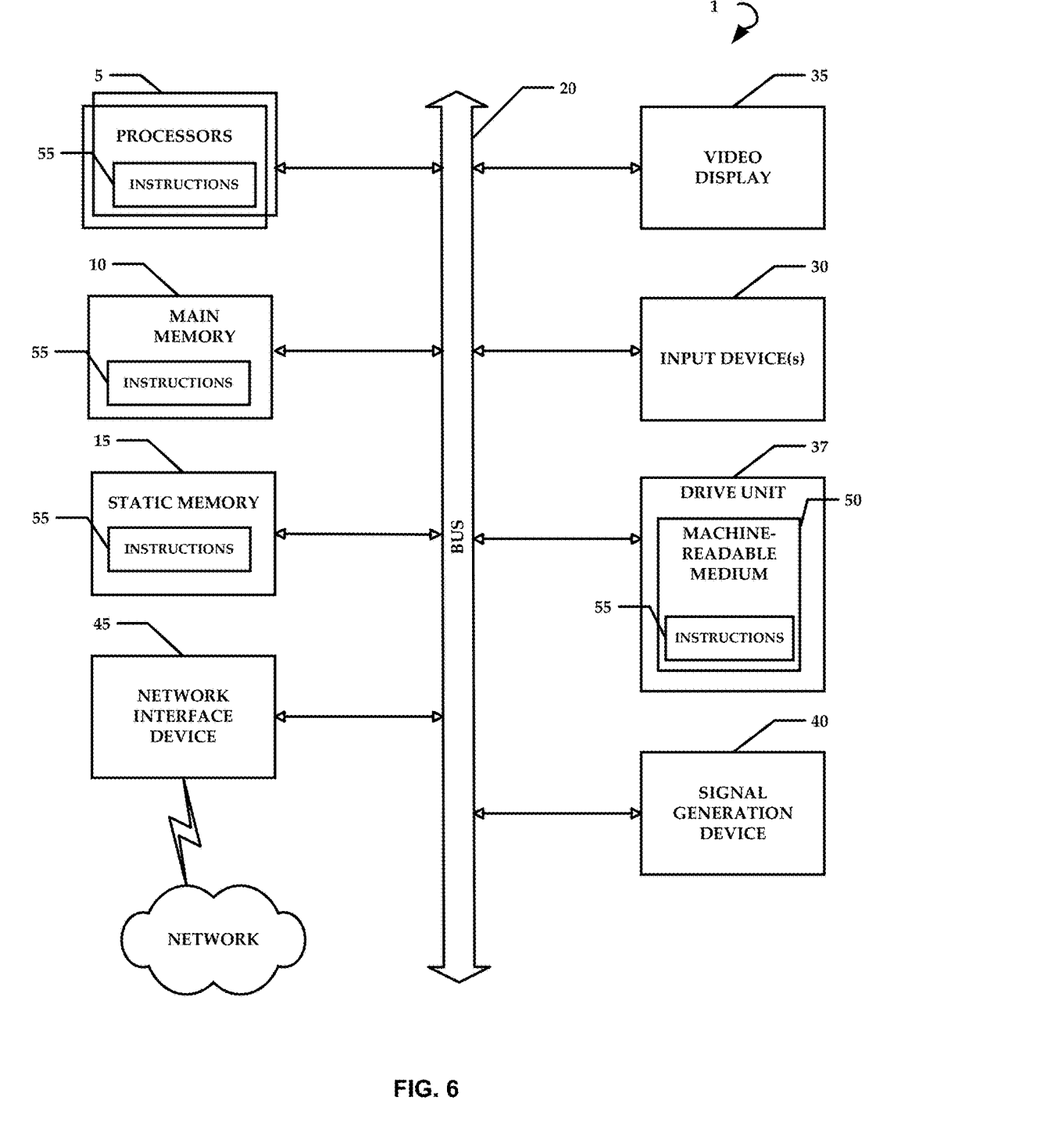
FIG. 6 illustrates a computer system used to execute embodiments of the present technology.

FIG. 6 is a diagrammatic representation of an example machine in the form of a computer system 1, within which a set of instructions for causing the machine to perform any one or more of the methodologies discussed herein. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method for converting a point cloud dataset into a hierarchical data structure for a lossless representation of an input file, the method comprising:
   reading header information of a collection of input files, the reading of the header information determining an axis-aligned bounding box of the collection of input files and a total number of data points in the point cloud dataset, the axis-aligned bounding box representing the amount of space taken by the point cloud dataset;
   determining a cache level of the total number of data points in the point cloud dataset to generate a plurality of caches, based on the total number of data points and the axis-aligned bounding box of the point cloud dataset, the cache level being a level of program memory to fit all of the total number of data points in the point cloud dataset;
   subdividing each of the plurality of caches into subtrees based on the determining of the cache level of the total number of data points in the point cloud dataset, the subtrees having a plurality of nodes; and
   generating a tileset based on sorting of the plurality of nodes in the subtrees, the generating of the tileset resulting in the hierarchical data structure comprising a root tile and a plurality of children.

2. The method of claim 1, further comprising:
   reading the total number of data points in the point cloud dataset to produce a plurality of input points; and
   inserting the plurality of input points into the plurality of caches, the inserting the plurality of input points into the plurality of caches comprising:
      projecting the total number of data points in the point cloud dataset to a coordinate system; and writing the total number of data points in the point cloud dataset to cache.

3. The method of claim 2, wherein the writing of the total number of data points in the point cloud dataset to the cache is multithreaded resulting in the collection of input files being processed in parallel.

4. The method of claim 2, wherein the inserting of the plurality of input points into the plurality of caches is based on a position check, the position check comprising:
appending the plurality of input points to a cache buffer; and
writing an input point of the plurality of input points in the cache buffer to disk when the cache buffer exceeds a memory threshold for the input point.

5. The method of claim 2, further comprising sorting unordered points of the plurality of input points into a spatially ordered linear array.

6. The method of claim 1, further comprising reading the plurality of caches from disk into program memory.

7. The method of claim 1, further comprising:
recursing the subtrees using a preordered traversal for the plurality of nodes, the preordered traversal being checking a parent node and then checking children nodes.

8. The method of claim 7, further comprising:
stopping the recursing of the subtrees using the preordered traversal of the plurality of nodes when a node of the plurality of nodes is a below threshold node, the below threshold node being less data points than a configuration specified maximum number of data points;
wherein the below threshold node is a leaf of the tileset.

9. The method of claim 8, further comprising:
aggregating the leaf of the tileset into a lossless representation of the collection of input files.

10. The method of claim 7, further comprising:
continuing the recursing of the subtrees using the preordered traversal of the plurality of nodes when a node of the plurality of nodes is an above threshold node, the above threshold node being more data points than a configuration specified maximum number of data points.

11. The method of claim 10, further comprising:
sampling the children nodes of the above threshold node resulting in a representative point collection for the above threshold node, the representative point collection being a lower level of detail of the above threshold node.

12. The method of claim 11, wherein the sampling of the children nodes of the above threshold node comprises at least one or more of: filtering data point outliers, preserving data point edges, and establishing minimum distances between data points.

13. The method of claim 11, further comprising:
writing the representative point collection to disk resulting in an interior tile of the tileset.

14. The method of claim 13, further comprising:
aggregating the interior tile of the tileset into a lossless representation of the collection of input files.

15. The method of claim 1, wherein the hierarchical data structure comprises an octree.

16. The method of claim 15, wherein the method further comprises:
building the octree where at each level, a different level of detail of the point cloud dataset is provided;
reading each of the data points in the point cloud dataset to determine to which cache each data point belongs, such that a data point position of a given data point is checked against bounding volumes of nodes at that cache level;
inserting each of the data points in the point cloud dataset into their respective caches, based upon the reading of each of the data points; and
writing cache buffers to disk even if the cache buffers are not full.

17. A method for converting a point cloud dataset into a hierarchical data structure for a lossless representation of an input file, the method comprising:
reading header information of a collection of input files, the reading of the header information determining an overall bounding box of the collection of input files and a total number of data points in the point cloud dataset;
determining a cache level of the total number of data points in the point cloud dataset to generate a plurality of caches, the cache level being a level of program memory to fit all of the total number of data points in the point cloud dataset;
subdividing each of the plurality of caches into subtrees based on the determining of the cache level of the total number of data points in the point cloud dataset, the subtrees having a plurality of nodes;
recursing the subtrees using a preordered traversal for the plurality of nodes, the preordered traversal being checking a parent node and then checking children nodes;
stopping the recursing of the subtrees using the preordered traversal of the plurality of nodes when a node of the plurality of nodes is a below threshold node, the below threshold node being less data points than a configuration specified maximum number of data points and the below threshold node being a leaf of a tileset; and
generating the tileset based on sorting of the plurality of nodes in the subtrees, the generating of the tileset resulting in the hierarchical data structure comprising a root tile and a plurality of children.

18. The method of claim 17, further comprising:
aggregating the leaf of the tileset into a lossless representation of the collection of input files.

19. A method for converting a point cloud dataset into a hierarchical data structure for a lossless representation of an input file, the method comprising:
reading header information of a collection of input files, the reading of the header information determining an overall bounding box of the collection of input files and a total number of data points in the point cloud dataset;
determining a cache level of the total number of data points in the point cloud dataset to generate a plurality of caches, the cache level being a level of program memory to fit all of the total number of data points in the point cloud dataset;
subdividing each of the plurality of caches into subtrees based on the determining of the cache level of the total number of data points in the point cloud dataset, the subtrees having a plurality of nodes;
recursing the subtrees using a preordered traversal for the plurality of nodes, the preordered traversal being checking a parent node and then checking children nodes;
continuing the recursing of the subtrees using the preordered traversal of the plurality of nodes when a node of the plurality of nodes is an above threshold node, the above threshold node being more data points than a configuration specified maximum number of data points;

sampling the children nodes of the above threshold node resulting in a representative point collection for the above threshold node, the representative point collection being a lower level of detail of the above threshold node; and generating a tileset based on sorting of the plurality of nodes in the subtrees, the generating of the tileset resulting in the hierarchical data structure comprising a root tile and a plurality of children.

20. The method of claim 19, wherein the sampling of the children nodes of the above threshold node comprises at least one or more of: filtering data point outliers, preserving data point edges, and establishing minimum distances between data points.

21. The method of claim 19, further comprising:
writing the representative point collection to disk resulting in an interior tile of the tileset.

22. The method of claim 21, further comprising:
aggregating the interior tile of the tileset into a lossless representation of the collection of input files.

* * * * *